(12) United States Patent
White

(10) Patent No.: US 8,822,354 B2
(45) Date of Patent: Sep. 2, 2014

(54) COATED FABRICS

(75) Inventor: Roger Gordon White, Lancashire (GB)

(73) Assignee: Clarkson Textiles Limited (GB)

( * ) Notice: Subject to any disclaimer, the term of this patent is extended or adjusted under 35 U.S.C. 154(b) by 1646 days.

(21) Appl. No.: 11/910,388

(22) PCT Filed: Mar. 31, 2006

(86) PCT No.: PCT/GB2006/001213
§ 371 (c)(1),
(2), (4) Date: Mar. 9, 2009

(87) PCT Pub. No.: WO2006/103470
PCT Pub. Date: Oct. 5, 2006

(65) Prior Publication Data
US 2010/0035054 A1 Feb. 11, 2010

(30) Foreign Application Priority Data
Apr. 1, 2005 (GB) .................................. 0506650.1

(51) Int. Cl.
A47G 9/00 (2006.01)
B32B 5/02 (2006.01)
B32B 27/12 (2006.01)
D06N 3/00 (2006.01)
D06N 7/00 (2006.01)

(52) U.S. Cl.
CPC .............. B32B 27/12 (2013.01); D06N 3/0056 (2013.01); D06N 7/00 (2013.01)
USPC .............. 442/136; 442/139; 442/71; 442/79; 442/123; 5/482; 5/500; 5/502

(58) Field of Classification Search
USPC .......... 442/136–147, 387, 394–398; 428/221, 428/341, 354, 920, 921; 5/482–502
See application file for complete search history.

(56) References Cited

U.S. PATENT DOCUMENTS

| | | | |
|---|---|---|---|
| 2,455,454 A | 12/1948 | Walter | |
| 3,956,233 A | 5/1976 | Fletcher | |
| 4,229,472 A * | 10/1980 | Suskind et al. | 428/113 |
| 4,353,945 A * | 10/1982 | Sampson | 428/90 |
| 4,746,565 A | 5/1988 | Bafford et al. | |
| 4,758,465 A | 7/1988 | McKinney et al. | |
| 5,034,266 A | 7/1991 | Kinlaw et al. | |
| 5,521,273 A * | 5/1996 | Yilgor et al. | 528/66 |
| 5,539,072 A * | 7/1996 | Wu | 526/304 |
| 5,741,582 A * | 4/1998 | Leaderman et al. | 428/317.5 |
| 5,753,568 A * | 5/1998 | Shimano et al. | 442/64 |
| 5,948,707 A | 9/1999 | Crawley et al. | |
| 2003/0054155 A1* | 3/2003 | Nomi et al. | 428/306.6 |
| 2004/0170800 A1* | 9/2004 | Richards | 428/90 |

FOREIGN PATENT DOCUMENTS

| | | |
|---|---|---|
| EP | 0038899 | 11/1981 |
| EP | 0365129 | 6/1989 |
| EP | 0329411 | 8/1989 |
| EP | 0365129 | 4/1990 |
| EP | 1335063 | 8/2003 |
| EP | 1371774 | 12/2003 |
| GB | 1523152 | 8/1978 |
| JP | 09078433 | 3/1997 |
| JP | 11279997 | 10/1999 |
| WO | WO 9526881 | 10/1995 |

OTHER PUBLICATIONS

Patents Examination Report, Feb. 5, 2009.

* cited by examiner

*Primary Examiner* — Jennifer A Steele
(74) *Attorney, Agent, or Firm* — Shumaker, Loop & Kendrick, LLP

(57) ABSTRACT

A coated fabric having a base fabric and an auxiliary layer laminated thereto, wherein the exposed face of the auxiliary layer is coated with a coating composition.

12 Claims, No Drawings

COATED FABRICS

This application is a national stage application of International Application No. PCTGB2006/001213, filed Mar. 31, 2006, which claims priority to British Patent Application No. 0506650.1 filed on Apr. 1, 2005.

This invention relates to the coating of fabrics to provide desired properties, for example enhanced flame retardancy and waterproofing.

Coated fabrics have very wide application, especially in the field of upholstery and bedding. For example, such fabrics are used to make mattress tickings and covers, curtains, clothing and upholstery for use in household and office environments, institutional use such as hospitals, nursing homes, doctors' surgeries, prisons etc and in marine, automotive, aircraft and other transport applications.

For many applications it is essential that the coated fabrics are flame retardant. Flame retardancy is usually achieved by application of a suitable coating. The present invention relates to the application of such a coating. However it should be noted that the invention is not limited to coatings having flame retardation properties. It may equally be applied to coatings which give abrasion resistance, anti-microbial, stain resistant, anti-soiling, anti-urine, pressure relieving, breathability or anti-seam slippage properties. Traditionally a laminated fabric is coated on its non-laminated side, with a chemical coating composition. Typically this may be carried out by using a doctor-knife over roller method, or a doctor-knife over air method or a dip coat and doctor-knife method or rotary screen application. The coated side may then be flock coated to improve its handle.

The applied coating composition is absorbed into the fabric, filling the interstices between yarns. As a result it may substantially alter the fabric properties; for example its stiffness, drape, stretch and handle. Thus a fabric which was highly elastic may become stiff, and may not fit to shape so easily. The surface of the fabric may feel rough or hard and so its comfort may be diminished.

Accordingly there is a need for a fabric which is coated with a coating composition to provide desirable characteristics, but without such loss of other desirable properties of the fabric.

In accordance with a first aspect of the present invention there is provided a coated fabric having a base fabric and an auxiliary layer laminated thereto, wherein the exposed face of the auxiliary layer is coated with a coating composition.

A preferred coating composition is one which provides the fabric with flame retardant properties.

A preferred coating composition may be water-based or solvent-based. It may be in the form of a paste or a foam.

Preferably the coating composition comprises a water-based foamed flame retardant compound. Suitable compounds include PVC and PVC derivatives, antimony oxides, aluminium oxides, aluminium hydrates, zinc borates, Halogen donors, phosphorous containing additives and melamines intumescent. Most preferably the coating composition comprises an acrylic-based compound or an acrylic co-polymer.

Preferably the coating composition has an applied weight in the range 20-400 grams per meter (gsm), preferably 40-250, more preferably 60-200, most preferably 75-150.

The fabrics used in the invention may be of any form including warp or weft knitted, woven, non-woven stitch bonded, non-woven chemical linked or non-woven melded.

Suitable textile materials for use in the base fabric to be laminated include polyester, nylon, elastane, cotton, viscose, wool or a blend of these (in any combination).

Preferably the base fabric weight has a weight of 60-600 gsm, preferably 80-400, more preferably 100-300, most preferably 140-250.

The auxiliary layer is preferably comprised of (and most preferably consists essentially of) a polymer selected from a polyolefin, a polyurethane, a polyamide, a polyvinylchloride, especially a polyester, or derivatives of the above. It may be a film or formed of filaments (e.g. non-woven web, or knitted, or woven).

The auxiliary layer may be fixed to the base fabric by any conventional technique. These include the use of a fusible melt interlayer between the auxiliary layer and the base fabric, a gluing technique with or without heating and flame lamination.

Preferably the auxiliary layer has an applied weight of 5-200 gsm, preferably 10-100, more preferably 15-50, especially 20-40.

Preferably an interlayer, glue or the like between the auxiliary layer and the base fabric as an applied weight of 4-150 gsm, preferably 8-100, more preferably 12-50, especially 15-30.

Because the coating composition is applied to the exposed face of the auxiliary layer and not directly to the base fabric, it does not become dispersed within the fibres or filaments of the fabric. As a result a coated fabric in accordance with the present invention typically has improved flexibility compared to a laminated fabric produced by the traditional method described above. Flock material can be added to the coating to improve handle and will allow the use of softer, more flexible coatings.

If the coating is covered by a flock material, there are fewer problems with the coating sticking to the substrate, or to other layers of the fabric when it is rolled into bolts.

Preferred laminated fabrics of the invention retain multi-directional stretch, with the result that products made from such fabrics are easy to manufacture, requiring fewer folds and darts to conform to the shape of the item being covered.

The coated fabrics of the invention may have good breathability. The coating composition may include a water repelling agent.

The coated fabrics of the invention may provide a high level of comfort for uses in close proximity to the human body; for example as mattress covers and tickings, bedding and upholstery.

The auxiliary layer may be coated with a coating composition prior to being laminated to the base fabric.

Preferably, however, the coating composition is applied to the exposed face of an auxiliary layer which has already been laminated to a base fabric.

The coating composition may be applied by any method for coating one side of a sheet material; for example the dip coating and doctor-knife technique, applied to one side of the fabric; or the doctor-knife on roller or doctor-knife over air method. Screen printing techniques may also be used. Such techniques are familiar to the person skilled in the art and need not be further described.

When a crush foam coating system is used, the coating medium is mechanically mixed with air into a foam of varying densities but can be a ratio of one part liquid to four parts air. This foam is applied to the fabric using a positive gap system and then dried. The dried foam is then passed through a crush roller or calender roller to consolidate the coating.

A coated fabric provided by the invention preferably has a Young's modulus of not less than 5% of the Young's modulus of the base fabric. Preferably the coated fabric has a Young's modulus of not more than 95% of the Young's modulus of the uncoated laminated fabric.

A coated fabric in accordance with the invention preferably retains at least 10% of the permeability to air of the base fabric (i.e. the corresponding uncoated fabric), more preferably at least 20%. The permeability is measured with respect to the Moisture Vapour Permeability test of BS3546, Part 4, 1991, Appendix C.

The invention will now be further described with reference to the following non-limiting example.

A warp knitted velour fabric comprising 85% polyester and 15% Lycra with a weight of 180 grams per square meter was laminated on a Mayer flatbed laminating machine. A 30 micron thickness polyester film having a micro-porous (breathable) construction was laminated to one side of the warp knitted fabric using an ethylene vinyl acetate copolymer web with a weight of 20 grams per square meter.

The laminating of the film to the warp knitted fabric was carried out at a temperature of 150° C. at a speed of 10 meters per minute.

The laminated fabric was allowed to cool before a coating was applied to the laminated side of the laminated fabric. A water-based composition containing a foamed acrylic-based copolymer containing antimony trioxide and a brominated flame retardant was applied by the doctor-knife over roller technique with a positive gap method to achieve an add-on of 100 grams per square meter to the laminated fabric. An electrostatic flock was applied to the coated side of the fabric prior to the drying process to improve handle. The whole product was then dried on a stenter machine at a feed rate of 20 meters per minute at a temperature of 140° C. After drying, the fabric was calendered to compact the final product.

The product was superior to a corresponding traditional coated fabric because it retained multi-dimensional stretch and breathability, to counteract sweating. It offers a high comfort level and is readily manufacturable into complex shapes e.g. chairs, sofas.

This fabric met the following required standards:
Flame retardancy: section 4 of BS5852 1990—Assessment of ignitability Source 5—Tested to IMO Resolution A652 (16);
Breathability: Moisture Vapour Permeability BS3546 Part 4 1991 Appendix C;
Water Repellent to Hydrostatic Head-Method 29A of BS3424 Part 26 1990;
Abrasion resistance: Severe Contract B5690 1991 as modified by annex F BS2543 1995;
Seam Slippage Meets requirements of BS2543 1995.

The invention claimed is:

1. A coated fabric having a fibre- or filament-formed base fabric and an auxiliary layer laminated thereto, wherein a side of the auxiliary layer opposite to the side of the auxiliary layer in contact with the base fabric is coated with a water-based coating composition;
   wherein the auxiliary layer is in the form of a film that prevents the water-based coating composition from directly contacting fibres or filaments of the base fabric, comprises at least one polymer selected from a polyolefin, a polyurethane, a polyester, a poly-amide, a polyvinyl chloride, or a derivative thereof, and has an applied weight of 15 to 50 grams per square meter;
   wherein the water-based coating composition has an applied weight in the range of 75 to 150 grams per square meter, comprises an acrylic-based compound or an acrylic co-polymer, and comprises a fire retardant;
   wherein the coated fabric retains multidirectional stretch; and
   wherein the coated fabric is a mattress ticking or upholstery fabric.

2. A coated fabric according to claim 1 wherein the water-based coating composition comprises a water repelling agent.

3. A coated fabric according to claim 1 wherein the water-based coating composition comprises an anti-microbial or anti-fungal agent.

4. A coated fabric according to claim 1 wherein the base fabric comprises a polyester fibre.

5. A coated fabric according to claim 1 wherein the auxiliary layer is bonded to the base fabric by a fusible interlayer.

6. A coated fabric according to claim 1 wherein the auxiliary layer is bonded to the base fabric by a glue.

7. A coated fabric according to claim 1 wherein the auxiliary layer is bonded to the base fabric by a heat laminate.

8. A coated fabric according to claim 1 wherein the coated fabric has a Young's modulus not less than 5% of the Young's modulus of the base fabric and not more than 95% of the Young's modulus of the uncoated laminated fabric in all directions.

9. A coated fabric according to claim 1 wherein the coated fabric retains at least 20% of the permeability to air of the base fabric.

10. A method of providing a coated fabric having a base fabric and an auxiliary layer laminated thereto, by application of a water-based coating composition to the opposite side of the auxiliary layer to the side in contact with the base fabric, wherein:
    the auxiliary layer is in the form of a film that prevents the water-based coating composition from directly contacting fibres or filaments of the base fabric, comprises at least one polymer selected from a polyolefin, a polyurethane, a polyester, a poly-amide, a polyvinyl chloride, or a derivative thereof, and has an applied weight of 15 to 50 grams per square meter;
    the water-based coating composition has an applied weight in the range of 75 to 150 grams per square meter, comprises an acrylic-based compound or an acrylic co-polymer, and comprises a fire retardant,
    the coated fabric retains multidirectional stretch; and
    wherein the coated fabric is a mattress ticking or upholstery fabric.

11. A method of providing a coated fabric having a base fabric and an auxiliary layer laminated thereto, comprising:
    applying a water-based coating composition to one side of the auxiliary layer and
    then securing the base fabric to the other side of the auxiliary layer, wherein:
    the auxiliary layer is in the form of a film that prevents the water-based coating composition from directly contacting fibres or filaments of the base fabric, comprises at least one polymer selected from a polyolefin, a polyurethane, a polyester, a poly-amide, a polyvinyl chloride, or a derivative thereof, and has an applied weight of 15 to 50 grams per square meter;
    the water-based coating composition has an applied weight in the range of 75 to 150 grams per square meter, comprises an acrylic-based compound or an acrylic co-polymer, and comprises a fire retardant and
    the coated fabric retains multidirectional stretch; and
    wherein the coated fabric is a mattress ticking or upholstery fabric.

12. A coated fabric according to claim 1 wherein the auxiliary layer is at least one of polyolefin, polyester, poly-amide, polyvinyl chloride, or a derivative thereof.

* * * * *